H. A. RESTETSKY.
RAKE ATTACHMENT.
APPLICATION FILED AUG. 10, 1914.
1,126,273.  
Patented Jan. 26, 1915.
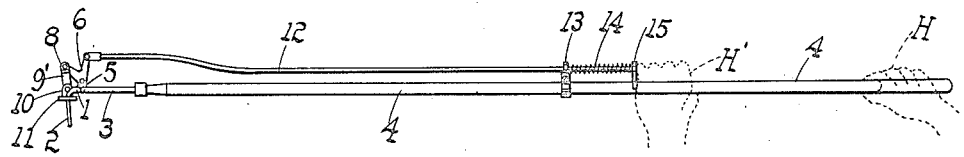
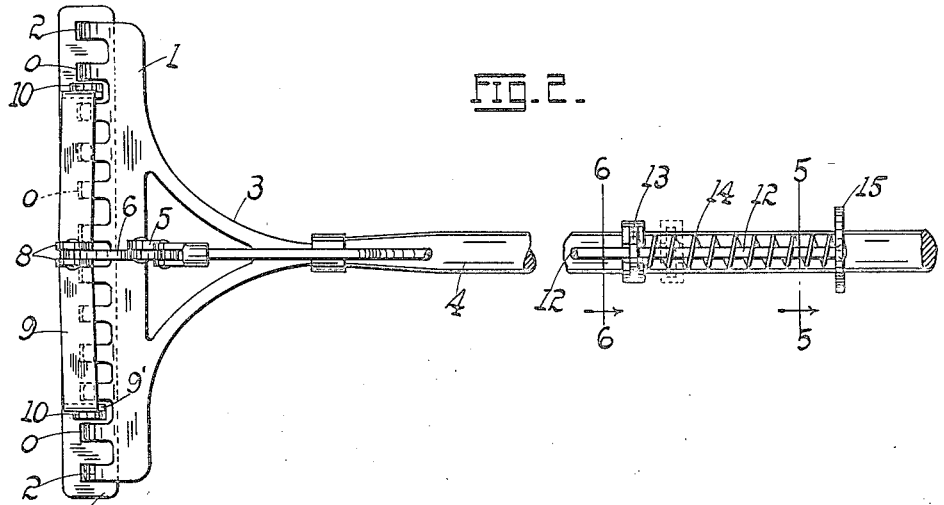
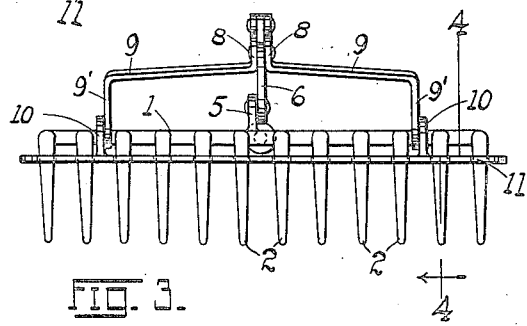
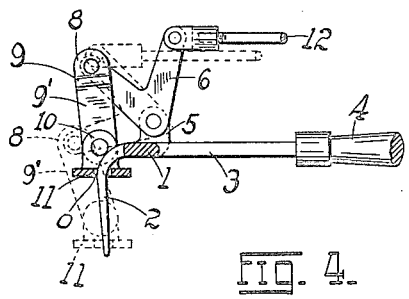
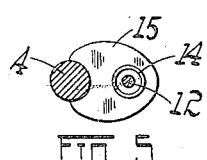
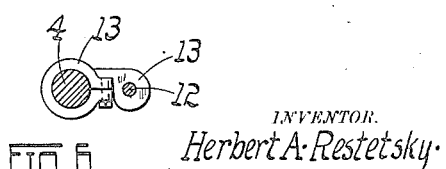
WITNESSES:  
Harry A. Benner  
Jos. Michel
INVENTOR.  
Herbert A. Restetsky  
BY  
ATTORNEY.

UNITED STATES PATENT OFFICE.

HERBERT A. RESTETSKY, OF MAPLEWOOD, MISSOURI.

RAKE ATTACHMENT.

1,126,273.

Specification of Letters Patent.

Patented Jan. 26, 1915.

Application filed August 10, 1914. Serial No. 856,100.

*To all whom it may concern:*

Be it known that I, HERBERT A. RESTETSKY, citizen of the United States, residing at Maplewood, in the county of St. Louis and State of Missouri, have invented certain new and useful Improvements in Rake Attachments, of which the following is a full, clear, and exact description, reference being had to the accompanying drawings, forming a part hereof.

My invention has relation to improvements in wiper attachments for rakes; and it consists in the novel features of construction more fully set forth in the specification and pointed out in the claims.

In the drawings, Figure 1 is a side elevation of an ordinary hand-rake having my invention applied thereto; Fig. 2 is an enlarged top plan of Fig. 1, some of the parts being broken; Fig. 3 is an end elevation of Fig. 2; Fig. 4 is a vertical cross-section on the zig-zag line 4—4 of Fig. 3, parts being left in elevation; Fig. 5 is a cross-sectional detail on the line 5—5 of Fig. 2; and Fig. 6 is a cross-sectional detail on the line 6—6 of Fig. 2.

The object of my invention is to provide any of the varieties of hand-rakes with a wiper for the teeth thereof, said wiper being controlled by the operator from a point on the handle of the rake, and within easy reach of the hand of the person raking.

A further object is to provide a wiper which is simple in construction, one which is easily manipulated, and one possessing further and other advantages better apparent from a detailed description of the invention, which is as follows:

Referring to the drawings, 1 represents the body of the rake, 2 the teeth thereof, 3 the shank and 4 the handle, as well understood in the art. Secured pivotally to a lug 5 on the body 1, (which lug is in substantial alinement with the axis of the handle 4) is a bell-crank 6, the outer arm of which is pivotally coupled between terminal ears or lugs 8, 8, of a pair of straps 9, 9, the outer arms 9′, 9′, of which are bent or deflected toward the rake-body, and have their ends pivotally coupled to ears or lugs 10, 10, of a wiper plate 11 through openings *o* of which the teeth 2 are free to play.

The inner arm of the bell-crank 6 has pivotally coupled thereto one end of an operating bar or rod 12, the rear portion of the bar operating freely through a lug or bearing 13 clamped or otherwise secured to the handle 4, said bearing being of course adjustable along the handle. Once adjusted, the bearing 13 forms a fixed abutment for one end of a compression spring 14 coiled about the bar 12, the rear end of the spring bearing against a guard 15 at the rear end of the actuating bar or rod 12.

The operation of the wiper is apparent from the foregoing description, and is substantially as follows: The handle 4 is held by the hands H, H′, of the operator substantially as shown in Fig. 1. Should any dirt, leaves, grasses and the like adhere to the rake-teeth, or any stones or earth lodge between the teeth, the operator pushes the hand H′, against the guard 15, thereby compressing the spring 14 and forcing the bar or rod 12 outwardly. This will oscillate the bell-crank 6 outwardly (see dotted position in Fig. 4) causing the straps 9, 9, (the arms 9′ of course are to be regarded as parts of the straps) to push the plate 11 along the teeth, and thus wipe the teeth. The teeth are thus kept clean and the spaces between them are always open and unobstructed. Upon release of the guard 15, the spring 14 expands, drawing the actuating rod 12 rearward, whereupon the bell-crank 6 oscillates in a reverse direction, the plate 11 is restored to its original position, and the teeth are again wiped. Thus the teeth are wiped with each stroke of the reciprocating wiper plate or member 11. It will be seen that with an outward oscillation of the bell-crank 6, the straps 9, 9, (which jointly constitute a connecting yoke between the bell-crank and the wiper plate 11) clear the teeth, the straps (or yoke formed thereby) oscillating away from the teeth. This allows the plate 11 to descend along the teeth substantially the full length of the teeth, thereby effectively wiping the latter. The guard 15 has a concaved portion partially spanning the periphery of the handle 4, the said guard freely riding along the handle with the reciprocations of the actuating rod 12. The bearing 13 is adjustable along the handle so that the tension of the spring 14 may be accordingly adjusted.

Having described my invention, what I claim is:—

1. In combination with a rake comprising a toothed body and a handle, a perforated wiper member reciprocable along the teeth of the rake, a bell-crank pivoted to the body, a yoke hinged to one arm of the bell-crank and having its terminals pivotally coupled to the wiper member, a rod positioned contiguous to the handle and having one end pivotally coupled to the opposite arm of the bell-crank, a bearing on the handle traversed by the rear portion of the rod, a rear terminal guard on the rod and a compression spring coiled about the rod and interposed between the bearing and terminal guard aforesaid.

2. In a toothed rake provided with a handle, a wiper operating to cleanse the teeth, a spring-controlled rod for actuating the wiper, and an adjustable bearing on the handle traversed by said rod and forming an abutment for one end of the spring controlling the rod.

In testimony whereof I affix my signature, in presence of two witnesses.

HERBERT A. RESTETSKY.

Witnesses:
EMIL STAREK,
JOS. A. MICHEL.